(12) United States Patent
Murase et al.

(10) Patent No.: US 12,104,959 B2
(45) Date of Patent: Oct. 1, 2024

(54) SHEET FOR TEMPERATURE MEASUREMENT, AND TEMPERATURE MEASUREMENT SYSTEM

(71) Applicant: Panasonic Intellectual Property Management Co., Ltd., Osaka (JP)

(72) Inventors: Masamitsu Murase, Kyoto (JP); Yusaku Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 447 days.

(21) Appl. No.: 17/577,267

(22) Filed: Jan. 17, 2022

(65) Prior Publication Data

US 2022/0136902 A1     May 5, 2022

Related U.S. Application Data (63) Continuation of application No. PCT/JP2020/026124, filed on Jul. 3, 2020.

(30) Foreign Application Priority Data

Jul. 24, 2019  (JP) ................................. 2019-136081

(51) Int. Cl.
   *G01J 5/00*   (2022.01)
   *G01J 5/02*   (2022.01)

(52) U.S. Cl.
   CPC .......... *G01J 5/0003* (2013.01); *G01J 5/0205* (2013.01); *G01J 2005/0077* (2013.01)

(58) Field of Classification Search
   CPC . G01J 5/0003; G01J 5/0205; G01J 2005/0077
   See application file for complete search history.

(56) References Cited

U.S. PATENT DOCUMENTS

| 2018/0262748 | A1 | 9/2018 | Shibata |
| 2018/0302555 | A1 | 10/2018 | Chew |
| 2020/0229782 | A1 | 7/2020 | Mada |

FOREIGN PATENT DOCUMENTS

| CN | 101646930 A | * | 2/2010 | ............ G01J 1/0455 |
| DE | 102009050474 B4 | * | 8/2013 | ............... G01J 5/02 |
| JP | 2011158433 A | * | 8/2011 | |
| JP | 2011-203193 A | | 10/2011 | |
| JP | 2018-179956 A | | 11/2018 | |
| WO | 2017/056473 A1 | | 4/2017 | |
| WO | 2019/058993 A1 | | 3/2019 | |

OTHER PUBLICATIONS

International Search Report for corresponding Application No. PCT/JP2020/026124, mailed Sep. 24, 2020.

* cited by examiner

*Primary Examiner* — Mirellys Jagan
(74) *Attorney, Agent, or Firm* — Renner, Otto, Boisselle & Sklar, LLP (57) ABSTRACT

A sheet for temperature measurement of the present disclosure is attached to an object when a surface temperature of the object is measured by a thermal camera, the sheet including a temperature measured section that has a first emissivity, and a marker that is disposed in the temperature measured section, has a second emissivity smaller than the first emissivity, and measures a distance between the thermal camera and the object.

5 Claims, 11 Drawing Sheets

| PHOTOGRAPHING DISTANCE (m) | SIZE OF MEASURED REGION (mm) | SIZE OF 1 PIXEL | SIZE OF 6 PIXELS |
|---|---|---|---|
| 0.3m | 11×11 | 1.8mm | 10.8mm |
| 0.5m | 19×19 | 3.1mm | 18.6mm |
| 1m | 37×37 | 6.1mm | 36.6mm |
| 2m | 74×74 | 12.2mm | 73.2mm |
| 3m | 110×110 | 18.3mm | 109.8mm |
| 4m | 147×147 | 24.4mm | 146.4mm |
| 5m | 183×183 | 30.5mm | 183.0mm |
| 6m | 220×220 | 36.6mm | 219.6mm |
| 7m | 257×257 | 42.7mm | 256.2mm |

SHEET FOR TEMPERATURE MEASUREMENT, AND TEMPERATURE MEASUREMENT SYSTEM

BACKGROUND

1. Technical Field

The present disclosure relates to a sheet for temperature measurement and a temperature measurement system.

2. Description of the Related Art

There is a known thermal camera that measures a temperature of an object by using an infrared radiation thermometer and generates a temperature distribution image on the basis of obtained temperature information. There has been a demand for managing temperature information of equipment or the like by using a thermal camera. Patent Literature (PTL) 1 discloses a method of providing in advance a measurement mark constituted by, for example, a black body and having a known radiation factor, on a surface of an object to be measured. In this case, a temperature of the measurement mark having a known radiation factor can be measured with high accuracy by the thermal camera, and therefore, a temperature of a region having an unknown radiation factor can be estimated on the basis of temperature information of the measurement mark.

PTL 2 discloses a camera calibration board in which a board and a plurality of flat plates have different temperatures and are processed such that heat does not move therebetween. In this case, regions having different temperatures are formed on the camera calibration board, and thus the camera calibration board can be extracted with high accuracy when an image is captured by the thermal camera.

PTL 1 is Unexamined Japanese Patent Publication No. 2011-203193.

PTL 2 is International Publication No. 2017/056473.

SUMMARY

It is difficult to detect a position of the measurement mark disclosed in PTL 1 with high accuracy from the image acquired by the thermal camera.

The camera calibration board disclosed in PTL 2 utilizes a method of creating a temperature difference between the board and the flat plates and displaying a feature point on a thermal camera image. However, the board has to be heated in order to create a temperature difference, and it is difficult to maintain the temperature difference between the board and the flat plates for a long time.

Therefore, an object of the present disclosure is to provide a sheet for temperature measurement whose position is detectable with high accuracy from an image acquired by a thermal camera.

A sheet for temperature measurement of the present disclosure is attached to an object when a surface temperature of the object is measured by a thermal camera, the sheet including a temperature measured section that has a first emissivity, and a marker that is disposed in the temperature measured section, has a second emissivity smaller than the first emissivity, and measures a distance between the thermal camera and the object.

A temperature measurement system of the present disclosure that measures a surface temperature of an object to which a sheet for temperature measurement is attached, the sheet having a temperature measured section provided with a marker and having a predetermined emissivity, the temperature measurement system including a thermal camera that acquires the surface temperature of the object and generates a temperature distribution image, a position identifier that identifies positions of the temperature measured section and the marker based on the temperature distribution image and acquires a shape and an apparent size of the marker, a distance calculator that calculates a distance between the thermal camera and the object based on the shape and the apparent size of the marker, and a temperature information calculator that calculates temperature information of the object based on the predetermined emissivity and the distance.

In the present disclosure, the position of the sheet for temperature measurement can be detected with high accuracy from the image acquired by the thermal camera.

DETAILED DESCRIPTION (Background to the Present Disclosure)

In increasing occasions, a thermal camera has been used to manage temperature information of equipment or the like. When temperature is measured by a thermal camera, it is possible to acquire highly accurate temperature information by setting various parameters such as an emissivity of the object (emissivity information), a distance between the object and the thermal camera (distance information), atmospheric temperature, and humidity. Among the parameters, the emissivity information and the distance information have a great influence on a temperature measurement result. It is therefore preferable to acquire accurate emissivity information and distance information when temperature is measured by the thermal camera.

Since the emissivity information varies depending on a state of the object, such as a material of the object, a surface state such as oxidation or contamination, and a surface shape, it is difficult to obtain the emissivity for each object. Therefore, as in PTL 1, there is a known method of measuring the temperature of an object by attaching a measurement mark constituted by a black tape or the like having a known emissivity to a surface of the object.

When the measurement mark such as a black tape is measured using a radiation thermometer, a position of the measurement mark is visually estimated from an image of the thermal camera, and a temperature pointer or the like is moved onto the measurement mark. At this time, when the position of the measurement mark can be identified from the image of the thermal camera by using an image processing technique, the temperature of the object can be automatically measured only by directing the thermal camera toward the measurement mark and photographing the measurement mark.

However, since the image acquired by the thermal camera is a temperature distribution image, and temperature around the measurement mark is the same, it is difficult to differentiate the image. It is thus difficult to detect the position of the measurement mark by the image processing technique.

Therefore, the inventor has studied a sheet for temperature measurement and a temperature measurement system for solving these problems, and devised the following configuration.

A sheet for temperature measurement according to an aspect of the present disclosure is attached to an object when a surface temperature of the object is measured by a thermal camera, the sheet including a temperature measured section that has a first emissivity, and a marker that is disposed in the temperature measured section, has a second emissivity smaller than the first emissivity, and measures a distance between the thermal camera and the object.

In this configuration, the position of the sheet for temperature measurement can be detected with high accuracy from the image acquired by the thermal camera.

The marker may be disposed in at least a part of a region along an outer periphery of the temperature measured section.

This configuration can provide the temperature measured section in a certain area or more, and thus allows accurate temperature measurement.

The marker may include a code that indicates information regarding the sheet for temperature measurement.

In this configuration, information such as the emissivity of the temperature measured section and an actual size of the marker can be embedded in the sheet for temperature measurement, and the temperature of the object, the distance to the object, or the like can be automatically corrected by acquiring information of the code when an image is captured.

The sheet for temperature measurement may further include an information display that is recognizable by a visible camera and indicates arbitrary information, in which the information display is disposed adjacent to the temperature measured section.

In this configuration, when a thermal camera having a coarse resolution is used, the sheet for temperature measurement can be still detected with high accuracy by using the visible camera together. In addition, more information can be embedded in the marker.

A temperature measurement system according to an aspect of the present disclosure measures a surface temperature of an object to which a sheet for temperature measurement is attached, the sheet having a temperature measured section provided with a marker and having a predetermined emissivity, the temperature measurement system including a thermal camera that acquires the surface temperature of the object and generates a temperature distribution image, a position identifier that identifies positions of the temperature measured section and the marker on the basis of the temperature distribution image and acquires a shape and an apparent size of the marker, a distance calculator that calculates a distance between the thermal camera and the object on the basis of the shape and the apparent size of the marker, and a temperature information calculator that calculates temperature information of the object on the basis of the predetermined emissivity and the distance.

In this configuration, the position of the sheet for temperature measurement can be detected with high accuracy from the image acquired by the thermal camera.

The marker may include a code that indicates information regarding the sheet for temperature measurement, and the position identifier may further identify a position of the code.

In this configuration, the information such as the emissivity of the temperature measured section or the actual size of the marker can be embedded in the sheet for temperature measurement.

The temperature measurement system may further include a visible camera that captures an image of the object and generates a visible image of the object, in which the position identifier further identifies the position of the code on the basis of the visible image.

In this configuration, when a thermal camera having a coarse resolution is used, the sheet for temperature measurement can be still detected with high accuracy by using the visible camera together. In addition, more information can be embedded in the marker.

The temperature measurement system may further include a code reader that acquires information of the code.

In this configuration, the temperature of the object, the distance to the object, or the like can be automatically corrected by acquiring the information of the code when an image is captured.

The sheet for temperature measurement may further include an information display that indicates arbitrary information, and the temperature measurement system may further include an information manager that associates the object with at least one of the temperature information, the information indicated by the code, or the arbitrary information indicated by the information display.

This configuration allows not only automatic correction of the temperature of the object, the distance to the object, or the like, but also simultaneous management of the object and information for identifying the object in association with each other.

(First Exemplary Embodiment)

Hereinafter, exemplary embodiments for carrying out the present disclosure will be described with reference to the drawings. In the drawings, substantially the same members are denoted by the same reference marks.

[Overall Configuration of Sheet for Temperature Measurement]

Figure 1A:
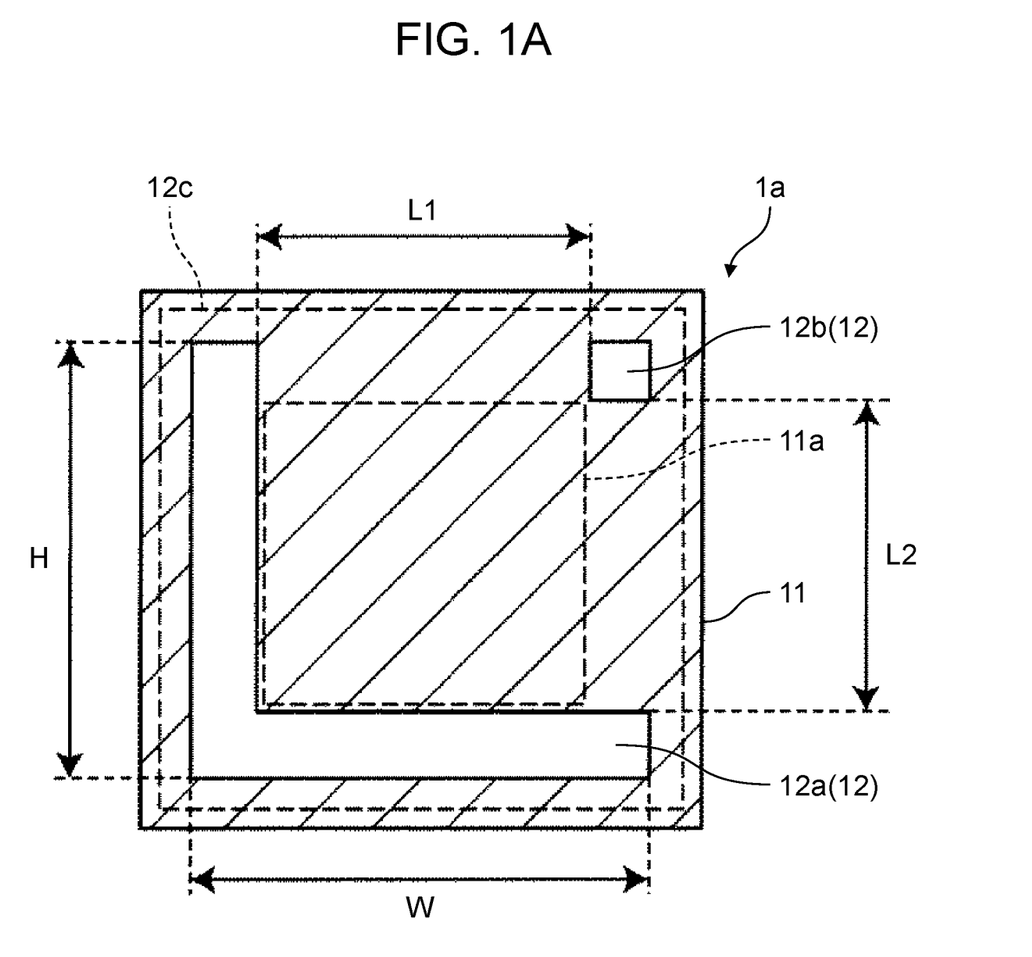
FIG. 1A is a plan view of a sheet for temperature measurement according to a first exemplary embodiment.
Figure 1B:
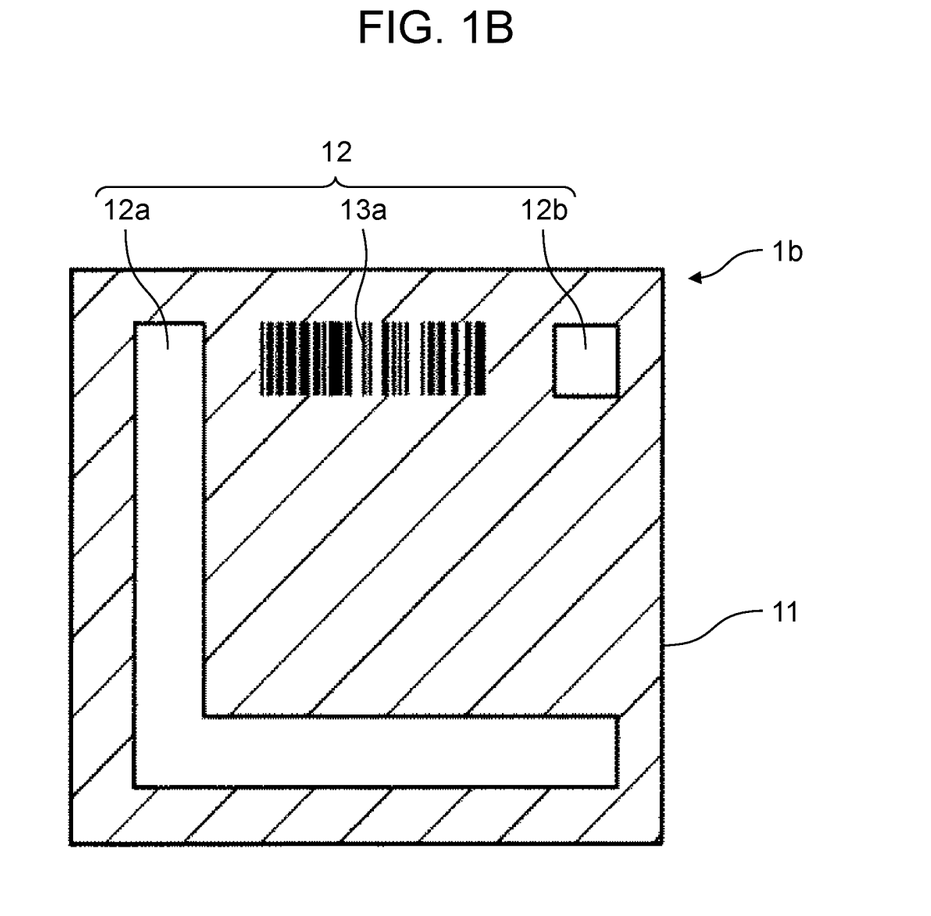
FIG. 1B is a plan view of another sheet for temperature measurement according to the first exemplary embodiment.
Figure 1C:
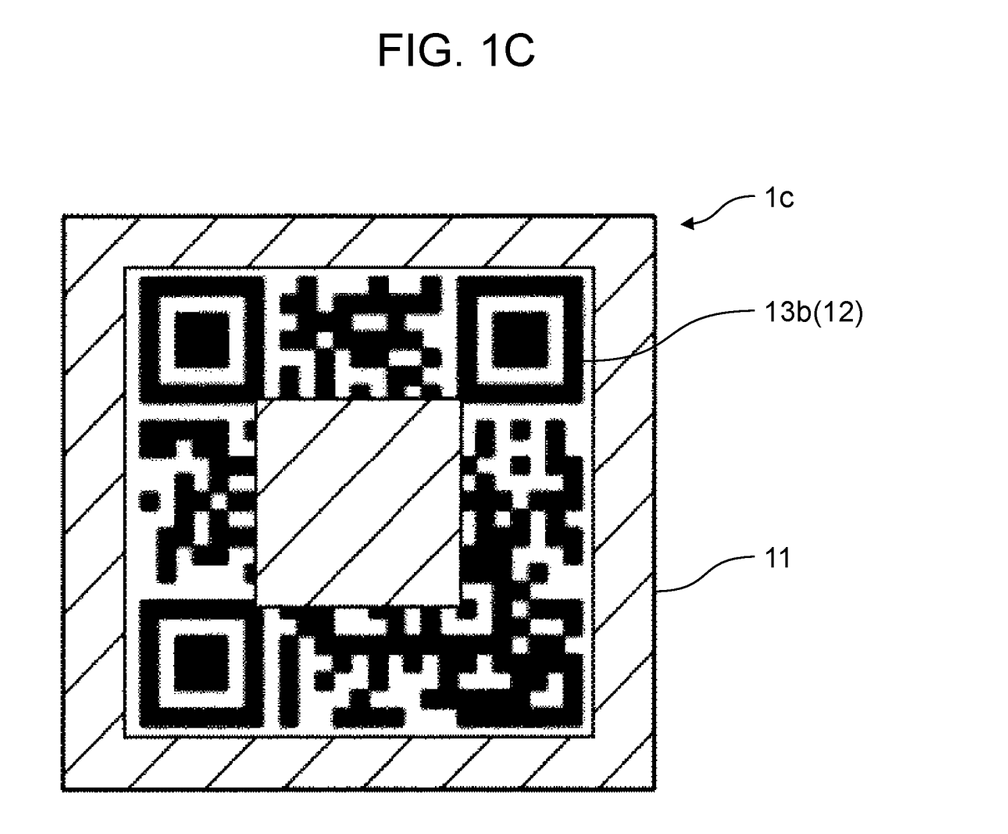
FIG. 1C is a plan view of still another sheet for temperature measurement according to the first exemplary embodiment.
Figure 2A:
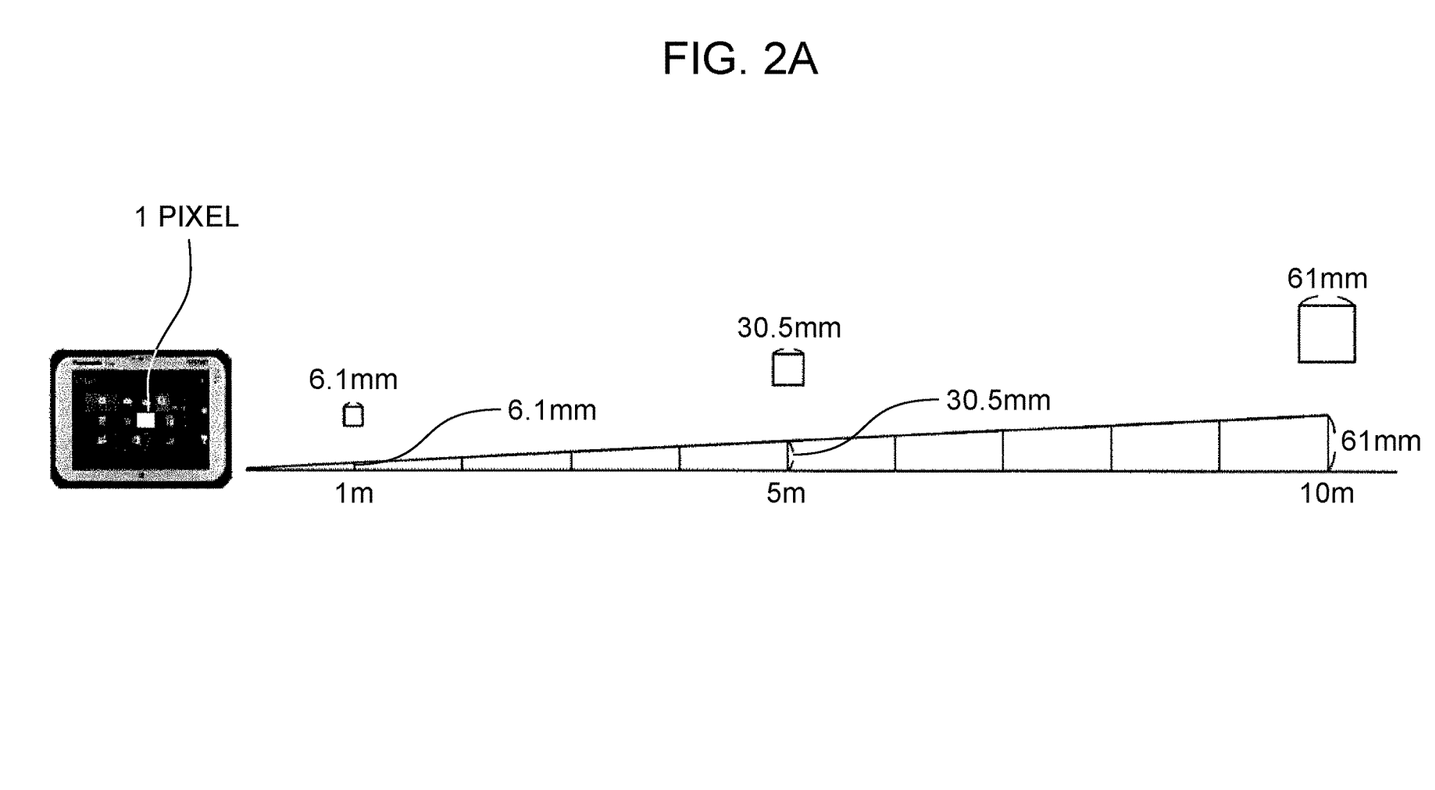
FIG. 2A is a schematic view for describing an instantaneous viewing angle of a thermal camera of a temperature measurement system according to the first exemplary embodiment.
Figure 2B:
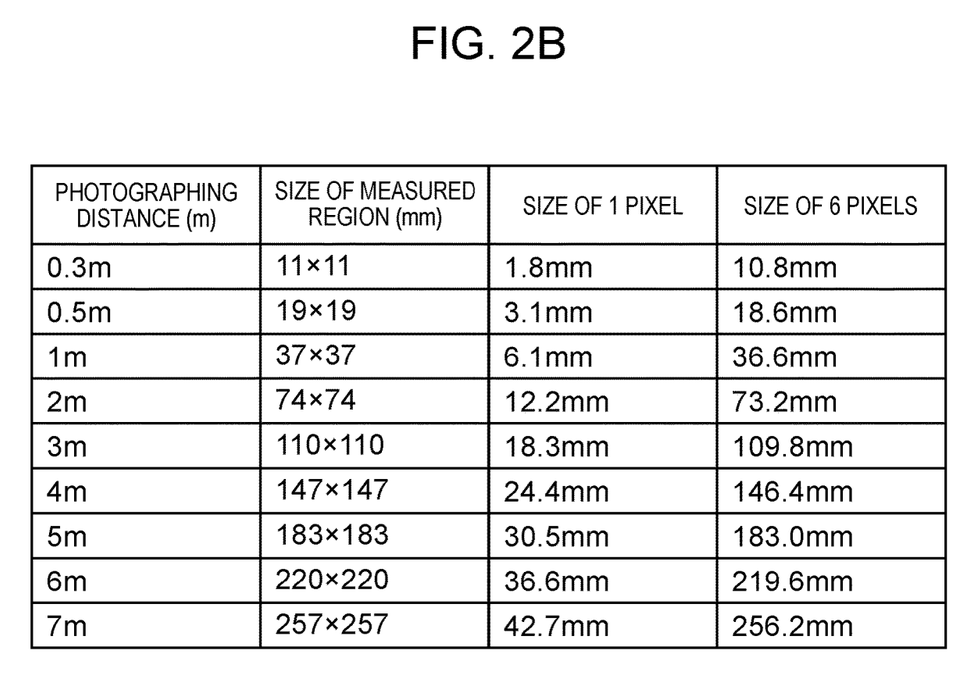
FIG. 2B is a table illustrating a necessary size of a measured region in accordance with a photographing distance.

FIGS. 1A to 1C are diagrams each illustrating a sheet for temperature measurement according to a first exemplary embodiment. FIG. 2A is a schematic view for describing an instantaneous viewing angle of a thermal camera of a temperature measurement system according to the first exemplary embodiment. FIG. 2B is a table illustrating a necessary size of a measured region in accordance with a photographing distance.

As illustrated in FIG. 1A, sheet 1a for temperature measurement of the present disclosure is, for example, a rectangular sheet, and is used by being attached to an object of temperature measurement by the thermal camera. Sheet 1a for temperature measurement includes temperature measured section 11 having a predetermined emissivity, and marker 12 that is formed in temperature measured section 11, has an emissivity smaller than the emissivity of temperature measured section 11, and measures a distance between the thermal camera and the object. The shape of sheet 1a for temperature measurement is not limited to a rectangular shape.

<Temperature Measured Section>

Temperature measured section 11 is constituted by a black body or the like having an emissivity close to one. In the present exemplary embodiment, a black tape having a predetermined size is used. Alternatively, a black body coating material may be applied to a sheet having a predetermined size by spraying or the like. Temperature measured section 11 includes measured region 11a that is a region for calculating temperature information from a temperature distribution image generated by the thermal camera.

A size required for measured region 11a varies depending on the instantaneous viewing angle and the photographing distance of the thermal camera, but in order to secure accuracy of a measured temperature, an area of larger than or equal to 6 pixels×6 pixels is preferably secured in the temperature distribution image. The instantaneous viewing angle is a minimum viewing angle at which 1 pixel of the thermal camera can capture a temperature distribution, and a numerical value varies depending on a resolution of the thermal camera or the like. In the present exemplary embodiment, a thermal camera having an instantaneous viewing angle of 6.1 mrad is used. By multiplying a value of the instantaneous viewing angle (mrad) by the photographing distance (m) to the object, a size of 1 pixel on the temperature distribution image at the photographing distance can be obtained.

For example, as illustrated in FIG. 2A, when a thermal camera having an instantaneous viewing angle of 6.1 mrad is used, an object of 6.1 mm square at a photographing distance of 1 m is represented by 1 pixel in the temperature distribution image. Similarly, at a photographing distance of 10 m, an object of 61 mm square is represented by 1 pixel in the temperature distribution image.

In this case, a standard of the size of the measured region with respect to the photographing distance for securing the region of 6 pixels×6 pixels in the temperature distribution image is as shown in the table in FIG. 2B. For example, when the photographing distance is 1 m, the size of 6 pixels is 36.6 mm, and thus a preferable size of measured region 11a is larger than or equal to about 37 mm×37 mm. Since a minimum required size of measured region 11a varies depending on the photographing distance, sheet 1a for temperature measurement including measured region 11a having a size corresponding to the photographing distance may be prepared. Note that, since a required size of measured region 11a varies depending on the photographing distance in accordance with the instantaneous viewing angle of the thermal camera to be used, the required size of measured region 11a is not necessarily limited to the table in FIG. 2B.

<Marker>

Marker 12 having a predetermined size and shape is formed in temperature measured section 11. In the present exemplary embodiment, marker 12 includes first marker 12a having an L shape and second marker 12b having a rectangular shape. Marker 12 can be formed by attaching a material having an emissivity smaller than the emissivity of temperature measured section 11, such as a metal tape, to temperature measured section 11.

Alternatively, when the object is metal or the like and has an emissivity smaller than the emissivity of temperature measured section 11, marker 12 may be formed by cutting out a part of temperature measured section 11. Marker 12 is not limited to metal, and can include a material having an emissivity smaller than the emissivity of temperature measured section 11.

A distance between the thermal camera and the object can be calculated on the basis of an actual size of marker 12 and a number of pixels of marker 12 in the temperature distribution image acquired by the thermal camera. Thus, the actual size of marker 12 is preferably a predetermined value set in advance.

For example, longitudinal length H or transverse length W of first marker 12a is preferably set to a predetermined value. Alternatively, a distance between first marker 12a and second marker 12b, for example, distance L1 or distance L2 in FIG. 1A may be set to a predetermined value.

The larger the difference between the emissivity of marker 12 and the emissivity of temperature measured section 11, the larger a contrast between marker 12 and temperature measured section 11 in the temperature distribution image, and the easier it is to identify sheet 1a for temperature measurement. It is therefore preferable that marker 12 includes a material having low emissivity such as metal. First marker 12a has an L shape, and such a characterized shape of marker 12 facilitates detection of sheet 1a for temperature measurement in the temperature distribution image.

In order to secure measured region 11a, marker 12 is preferably formed in at least a part of region 12c along an outer periphery of temperature measured section 11. A state of being formed in at least a part of region 12c along the outer periphery of temperature measured section 11 includes, for example, a state in which marker 12 is formed at four corners of temperature measured section 11, or a state in which marker 12 is formed in a half of temperature measured section 11 and the other half is measured region 11a. That is, as long as measured region 11a having a necessary size is secured, the arrangement, shape, and size of marker 12 are arbitrary.

Marker 12 may include a code that indicates information regarding sheet 1a for temperature measurement. For example, as illustrated in sheet 1b for temperature measurement in FIG. 1B, marker 12 includes code 13a indicated by a one-dimensional code. Alternatively, as illustrated in sheet 1c for temperature measurement in FIG. 1C, marker 12 may be code 13b indicated by a two-dimensional code such as a QR code (registered trademark). Code 13a, 13b preferably includes, for example, information regarding sheet 1a to 1c for temperature measurement such as the emissivity of temperature measured section 11 and the shape and actual size of marker 12. Code 13a, 13b is not limited to a one-dimensional code or a two-dimensional code, and may be a character string or the like.

[Overall Configuration of Temperature Measurement System]

Figure 3:
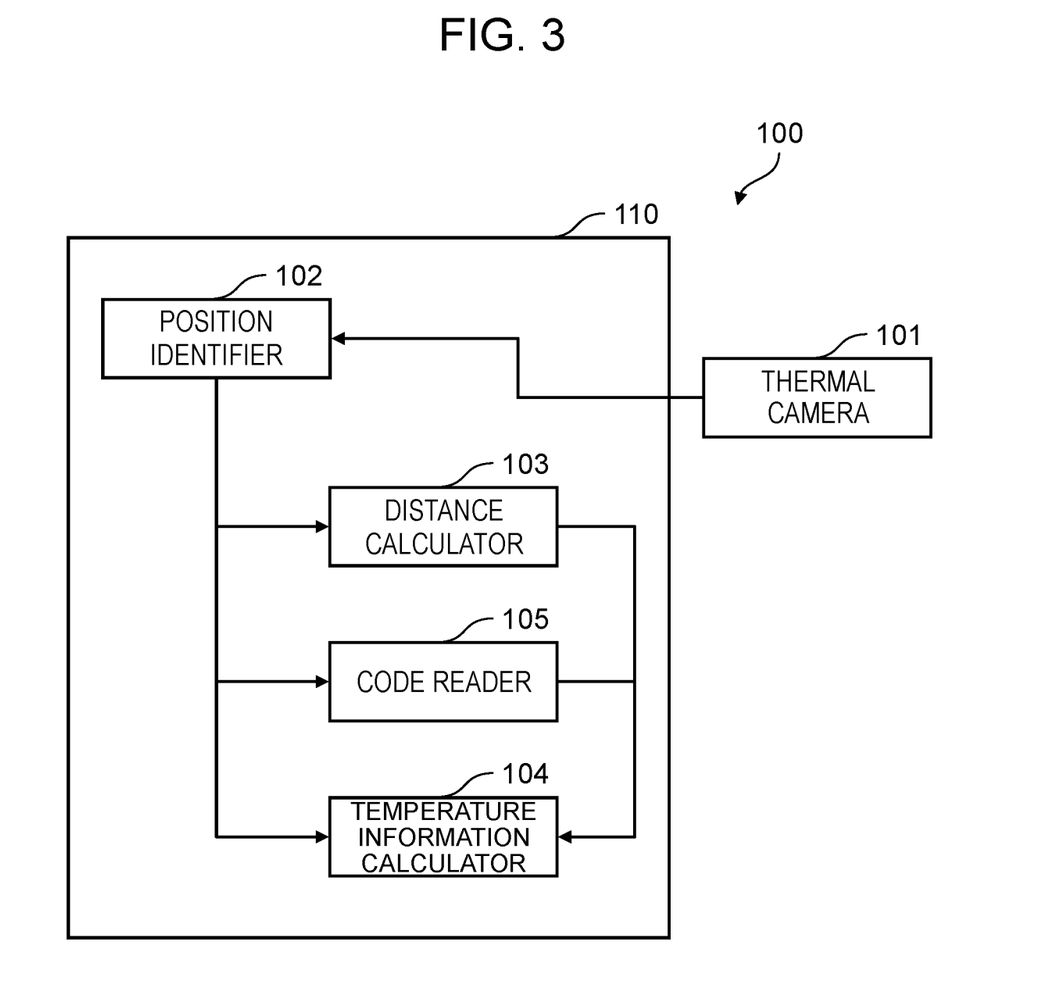
FIG. 3 is a block diagram illustrating a configuration of the temperature measurement system according to the first exemplary embodiment.

FIG. 3 is a block diagram illustrating a configuration of the temperature measurement system according to the first exemplary embodiment.

Temperature measurement system 100 according to the present exemplary embodiment includes thermal camera 101, position identifier 102, distance calculator 103, temperature information calculator 104, and code reader 105, and measures a surface temperature of the object to which the sheet for temperature measurement is attached. In the present exemplary embodiment, position identifier 102, distance calculator 103, temperature information calculator 104, and code reader 105 are included in controller 110, but the present invention is not limited to this configuration. Controller 110 can include, for example, a microcontroller equipped in thermal camera 101, a central processing unit (CPU) equipped in an information processing terminal such as a personal computer (PC) or a tablet to which thermal camera 101 is connected, and the like.

<Thermal Camera>

Thermal camera 101 acquires the surface temperature of the object and forms a temperature distribution image. Thermal camera 101 is, for example, an infrared camera, and generates a temperature distribution image by detecting infrared energy radiated from the object and converting a detected amount of infrared energy into a temperature. Thermal camera 101 according to the present exemplary embodiment has an instantaneous viewing angle of 6.1 mrad, but is not limited to this configuration, and may be any camera as long as being able to detect infrared energy radiated from the object.

<Position Identifier>

Position identifier 102 identifies positions of temperature measured section 11 and marker 12 of the sheet 1a for temperature measurement on the basis of the temperature distribution image generated by thermal camera 101, and acquires the shape and apparent size of marker 12. Note that the apparent size of marker 12 is a number of display pixels of marker 12 on the temperature distribution image. Since the emissivity of temperature measured section 11 is different from the emissivity of marker 12, temperature measured section 11 and marker 12 are displayed in different temperature distributions in the temperature distribution image. The positions of temperature measured section 11 and marker 12 can be identified by the contrast between temperature measured section 11 and marker 12. Position identifier 102 acquires the shape and apparent size of marker 12 whose position has been identified, on the temperature distribution image, that is, the number of display pixels of marker 12 on the temperature distribution image. The number of display pixels of marker 12 on the temperature distribution image corresponds to the "shape and apparent size of the marker" of the present disclosure. When marker 12 includes code 13a, 13b as in sheet 1b, 1c for temperature measurement, position identifier 102 further identifies a position of code 13a, 13b.

<Distance Calculator>

Distance calculator 103 calculates the photographing distance between thermal camera 101 and the object on the basis of the shape and apparent size of marker 12. The distance between thermal camera 101 and the object can be calculated on the basis of the number of display pixels of marker 12 on the temperature distribution image acquired by position identifier 102 and the actual size of marker 12. For example, when transverse length W of first marker 12a is 30.5 mm, and the number of pixels of a portion of transverse length W of first marker 12a acquired by position identifier 102 is 1 pixel, the distance between thermal camera 101 and the object, that is, the photographing distance is calculated to be 5 m from the table in FIG. 2B. Note that the actual size of marker 12 can be input in advance as a parameter. Alternatively, when marker 12 includes code 13a, 13b as in sheet 1b, 1c for temperature measurement, information on the shape and apparent size of marker 12 may be included in code 13a, 13b. In this case, information owned by code 13a, 13b can be read by code reader 105 described later. The photographing distance calculated by distance calculator 103 is used when temperature information calculator 104 calculates temperature information.

<Temperature Information Calculator>

Temperature information calculator 104 calculates temperature information of the object on the basis of the emissivity of temperature measured section 11 and the photographing distance calculated by distance calculator 103. The temperature information of temperature measured section 11 on the temperature distribution image identified by position identifier 102 is calculated on the basis of the emissivity of temperature measured section 11 and the photographing distance, and the display of the temperature distribution image is adjusted. The emissivity of temperature measured section 11 can be input in advance as a parameter. Alternatively, when marker 12 includes code 13a, 13b as in sheet 1b, 1c for temperature measurement, a value of the emissivity of temperature measured section 11 may be included in code 13a, 13b. In this case, information owned by code 13a, 13b can be acquired by code reader 105 to be described later.

<Code Reader>

When marker 12 includes code 13a, 13b as in sheet 1b, 1c for temperature measurement, code reader 105 reads the information indicated by code 13a, 13b. The information owned by code 13a, 13b whose positions on the heat distribution image have been identified by position identifier 102 is analyzed by code reader 105. For example, a barcode reader that reads a barcode or a two-dimensional code can be adopted as code reader 105. The information acquired by code reader 105 is used when temperature information calculator 104 calculates temperature information.

[Operation]

Figure 4:
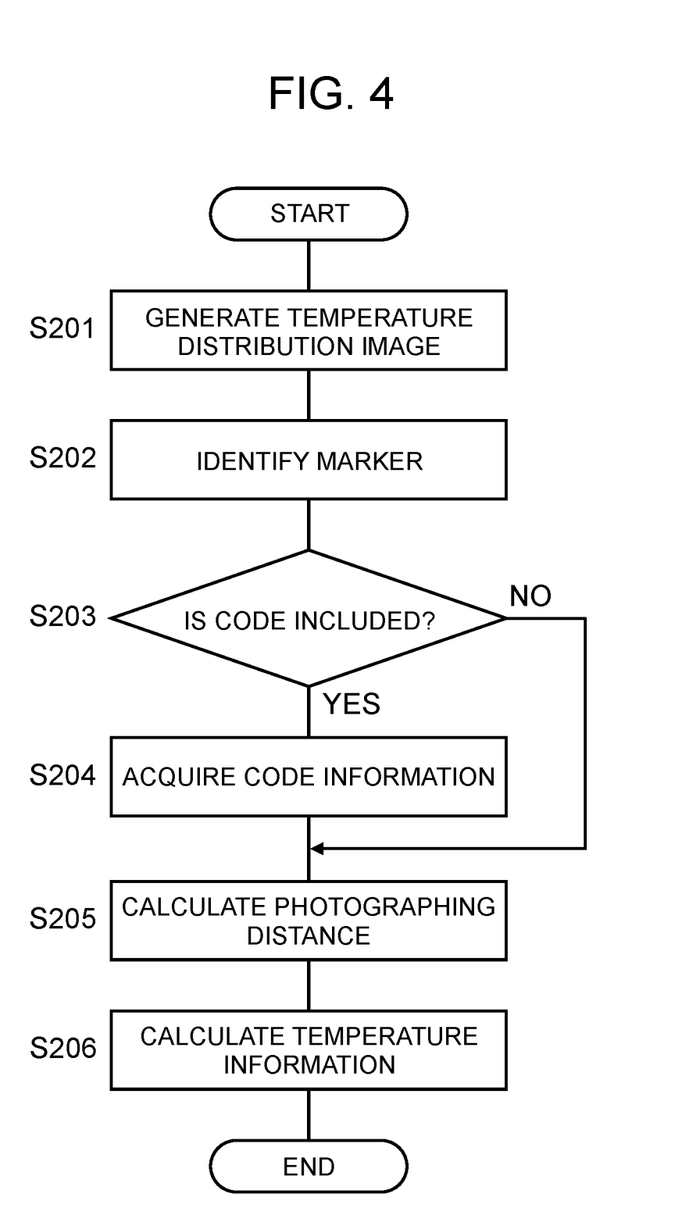
FIG. 4 is a flowchart of an operation of the temperature measurement system according to the first exemplary embodiment.

FIG. 4 is a flowchart of an operation of the temperature measurement system according to the first exemplary embodiment. An example of the operation of the temperature measurement system will be described with reference to FIG. 4.

(1) Thermal camera 101 generates a temperature distribution image of the object to which sheet 1a to 1c for temperature measurement is attached (step S201).

(2) On the basis of the temperature distribution image generated in step S201, position identifier 102 identifies the positions of temperature measured section 11 and marker section 12 of sheet 1a to 1c for temperature measurement (step S202). In addition, the apparent size (the number of display pixels) of the marker on the temperature distribution image is acquired. Further, when marker 12 includes code 13a, 13b as in sheet 1b, 1c for temperature measurement, the position of code 13a, 13b is further identified.

(3) When marker 12 includes code 13a, 13b (Yes in step S203), the information owned by code 13a, 13b is read by code reader 105 (step S204). Code 13a, 13b can include information regarding sheet 1b, 1c for temperature measurement, such as the value of the emissivity of temperature measured section 11 or the actual size of marker 12. When marker 12 does not include code 13a, 13b (No in step S203), the processing proceeds to step S205.

(4) The photographing distance between thermal camera 101 and the object is calculated on the basis of the apparent size of marker 12 on the temperature distribution image acquired in step S202 (step S205). Note that, for the calculation of the photographing distance, information on the actual size of marker 12 input in advance or the actual size of marker 12 included in code 13a, 13b can be used.

(5) Temperature information of measured region 11a of temperature measured section 11 is calculated on the basis of the value of the emissivity of temperature measured section 11 input in advance or included in code 13a, 13b and the photographing distance calculated in step S205 (step S206).

[Effects]

In the sheet for temperature measurement and the temperature measurement system according to the present exemplary embodiment, the position of the sheet for temperature measurement can be detected with high accuracy from the image acquired by the thermal camera. The sheet for temperature measurement of the present disclosure includes a temperature measured section having a predetermined emissivity and a marker having an emissivity smaller than an emissivity of the temperature measured section, and can calculate the distance between the object and the thermal camera on the basis of the apparent size of the marker on the temperature distribution image. It is therefore possible to measure the temperature with high accuracy without setting a parameter every time the temperature is measured. In addition, since the marker includes a code indicating information regarding the sheet for temperature measurement, image processing is performed on the temperature distribution image generated by the thermal camera, and then information such as the emissivity of the temperature measured section included in the code and the actual size of the marker can be acquired. Including necessary information in the code eliminates the need for manually setting the parameter in advance and simplifies the operation for temperature measurement. Further, since there is no need for providing regions having different temperatures on the sheet for temperature measurement, the sheet for temperature measurement need not be heated, and can be used for temperature measurement of an arbitrary object to which the sheet for temperature measurement can be attached.

Second Exemplary Embodiment

[Overall Configuration]

A sheet for temperature measurement and a temperature measurement system according to a second exemplary embodiment of the present disclosure will be described. In the second exemplary embodiment, the same or equivalent configurations as those in the first exemplary embodiment are denoted by the same reference numerals as those in the first exemplary embodiment. In the second exemplary embodiment, the description overlapping with the first exemplary embodiment is omitted.

Figure 5:
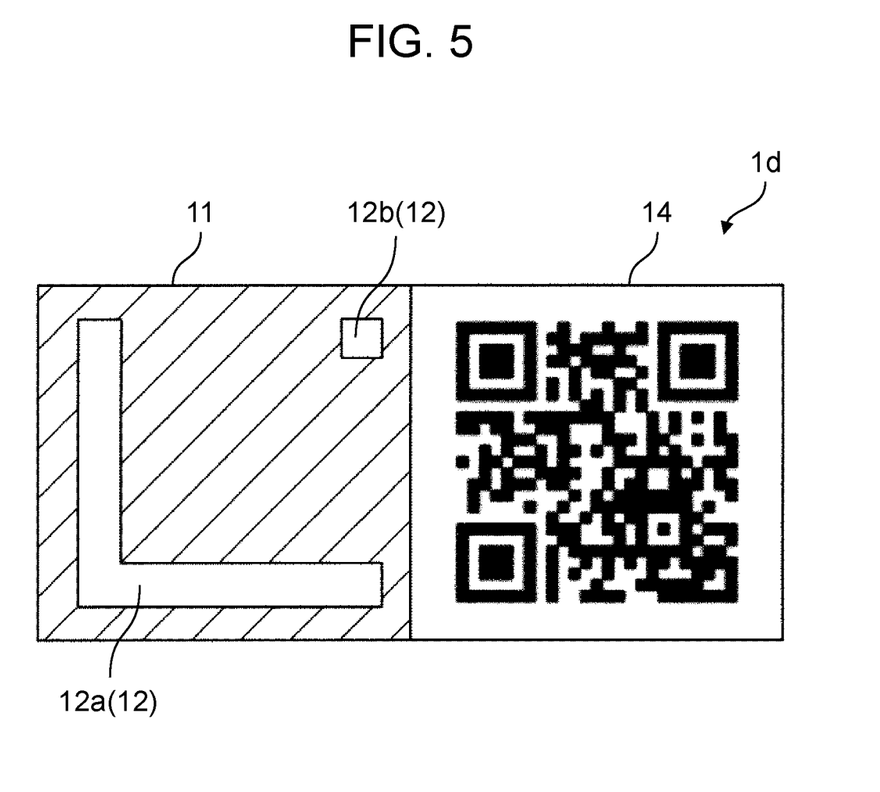
FIG. 5 is a plan view of a sheet for temperature measurement according to a second exemplary embodiment.
Figure 6:
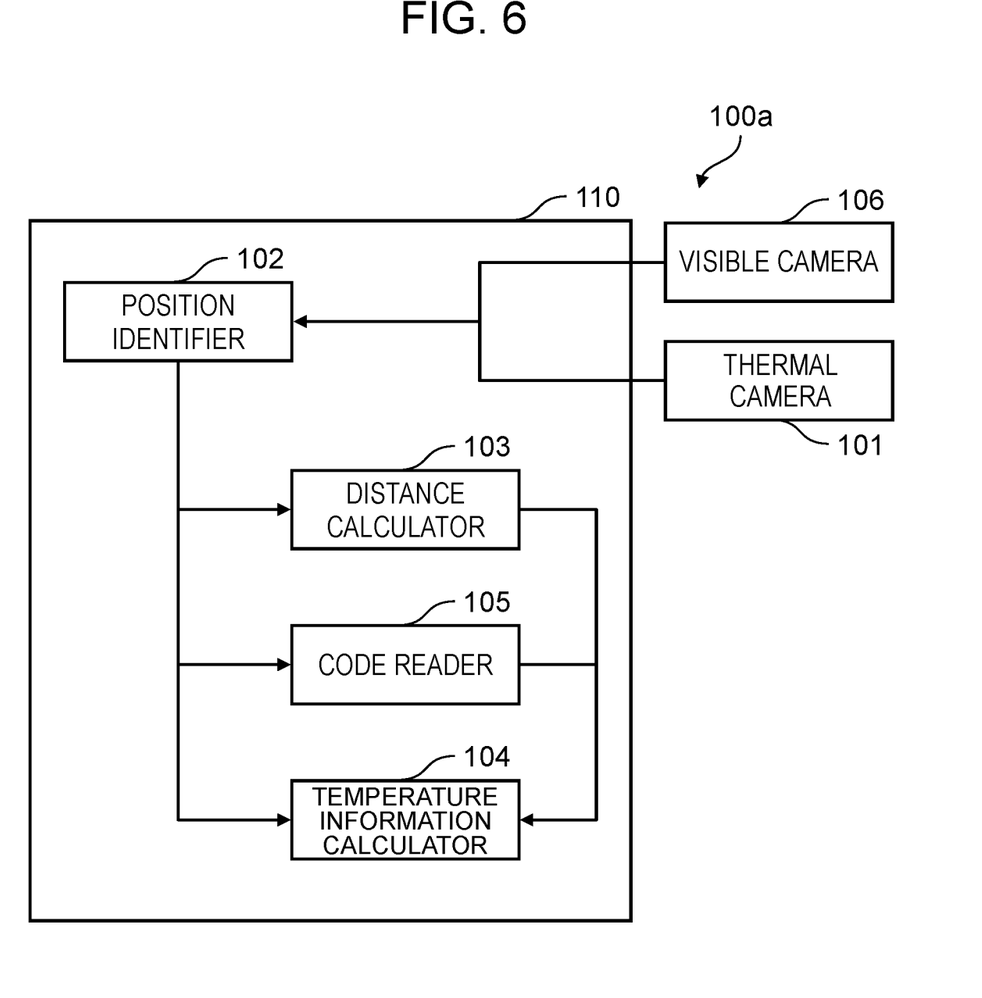
FIG. 6 is a block diagram illustrating a configuration of a temperature measurement system according to the second exemplary embodiment.

FIG. 5 is a view of a sheet for temperature measurement according to the second exemplary embodiment. FIG. 6 is a block diagram illustrating a configuration of the temperature measurement system according to the second exemplary embodiment.

As illustrated in FIG. 5, sheet 1d for temperature measurement according to the second exemplary embodiment is different from the sheet for temperature measurement according to the first exemplary embodiment in that sheet 1d for temperature measurement includes information display 14 that is recognizable by a visible camera and indicates arbitrary information, and information display 14 is formed adjacent to temperature measured section 11. As illustrated in FIG. 6, temperature measurement system 100a according to the second exemplary embodiment is different from the temperature measurement system according to the first exemplary embodiment in that temperature measurement system 100a includes visible camera 106 that captures an image of an object and generates a visible image of the object.

Information display 14 of sheet 1d for temperature measurement can include a material recognizable by visible camera 106. Further, information display 14 may be formed integrally with temperature measured section 11. Information display 14 can include arbitrary information. Information display 14 includes, for example, a barcode or a two-dimensional code including information regarding the object. In this case, information display 14, which is recognized by visible camera 106, can include more information than code 13a, 13b included in marker 12 of sheet 1b, 1c for temperature measurement. Information display 14 may include a character string or the like.

On the basis of the visible image generated by visible camera 106 of temperature measurement system 100a, position identifier 102 identifies a position of information display 14. Furthermore, position identifier 102 may identify the positions of marker 12 and information display 14 on the basis of the visible image and acquire the shape and apparent size of marker 12. In general, most visible cameras are less expensive and have higher definition than thermal cameras. Thus, the sheet for temperature measurement can be detected with high accuracy by identifying marker 12 and information display 14 on the basis of the visible image generated by the visible camera.

[Operation]

Figure 7:
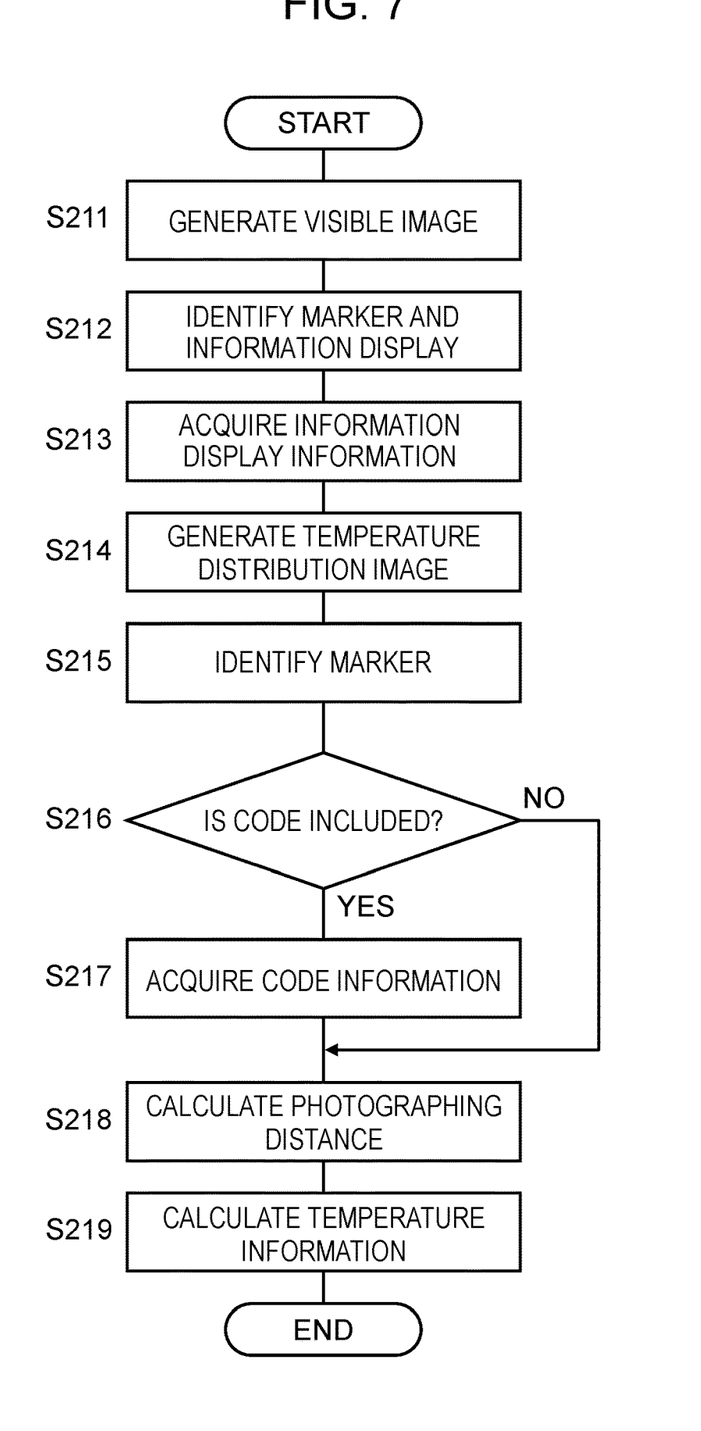
FIG. 7 is a flowchart of an operation of the temperature measurement system according to the second exemplary embodiment.

FIG. 7 is a flowchart of an operation of temperature measurement system 100a according to the present exemplary embodiment. The operation of the temperature measurement system according to the present exemplary embodiment will be described with reference to FIG. 7.

(1) Visible camera 106 generates a visible image of the object to which sheet 1d for temperature measurement is attached (step S211).

(2) On the basis of the visible image generated in step S211, position identifier 102 identifies marker 12 and information display section 14 (step S212). Note that sheet 1d for temperature measurement need not include information display 14, and in this case, position identifier 102 identifies the position of marker 12 on the basis of the visible image.

(3) Temperature measurement system 100a acquires information indicated by information display 14 (step S213).

(4) Steps S214 to S219 are the same as steps S201 to S206 in the flowchart of temperature measurement system 100 according to the first exemplary embodiment shown in FIG. 4.

In the present exemplary embodiment, the visible image is generated by the visible camera, and then the temperature distribution image is generated by the thermal camera. However, an order of the operations may be different. For example, the visible image may be generated by the visible camera after the temperature distribution image is generated by the thermal camera.

[Effects]

In sheet 1d for temperature measurement and temperature measurement system 100a according to the present exemplary embodiment, when a resolution of thermal camera 101 is low, sheet 1d for temperature measurement can be still detected with high accuracy by using visible camera 106 together. In addition, information display 14 recognizable by the visible camera allows more information to be embedded in the sheet for temperature measurement.

Third Exemplary Embodiment

A temperature measurement system according to a third exemplary embodiment of the present disclosure will be described. In the third exemplary embodiment, the same or equivalent configurations as those in the first exemplary embodiment are denoted by the same reference numerals as those in the first exemplary embodiment. In the third exemplary embodiment, the description overlapping with the first exemplary embodiment is omitted.

Figure 8:
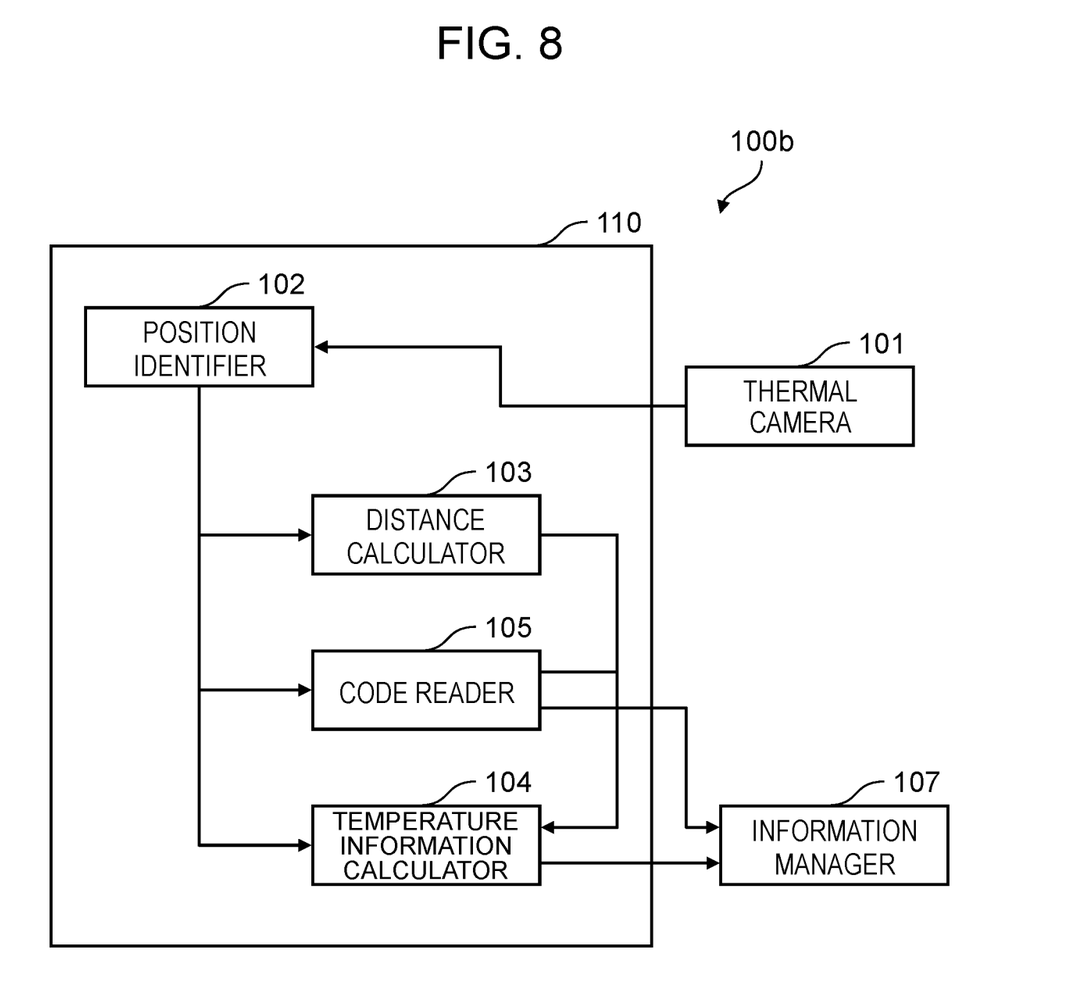
FIG. 8 is a block diagram illustrating a configuration of a temperature measurement system according to a third exemplary embodiment.

FIG. 8 is a block diagram illustrating a configuration of temperature measurement system 100b according to the third exemplary embodiment. Temperature measurement system 100b according to the third exemplary embodiment is different from the temperature measurement system according to the first exemplary embodiment in that temperature measurement system 100b includes information manager 107 that associates an object with at least one of the temperature information, the information of the code, or the information of the information display. Temperature measurement system 100b can measure any of sheets 1a to 1d for temperature measurement attached to the object.

Information manager 107 manages the information acquired by code reader 105 and the information acquired by the temperature information calculator 104 in association with each other. For example, by including information regarding the object (for example, an object ID, abnormal temperature information, or the like) in code 13a, 13b or information display 14, it is possible to manage the image by associating the temperature distribution image with the information regarding the object. Associating the temperature distribution image and the object ID with each other facilitates recognition of which image belongs to which object, and allows efficient management of the temperature distribution image. In addition, by associating the temperature distribution image and the abnormal temperature information with each other, an alert can be output in a case where the object is in an abnormal temperature state, and abnormality can be detected easily.

Other Exemplary Embodiments

Although having been described with reference to the above exemplary embodiments, the present disclosure is not limited to the above exemplary embodiments.

For example, in the first exemplary embodiment, code 13a, 13b of sheet 1b, 1c for temperature measurement has information regarding sheet 1b, 1c for temperature measurement (for example, the emissivity of temperature measured section 11, the actual size of marker 12, or the like), but may have other information.

In the second exemplary embodiment, sheet 1d for temperature measurement having information display 14 recognizable by visible camera 106 is used when the temperature measurement is performed by temperature measurement system 100a, but sheet 1a to 1c for temperature measurement may be used. By recognizing code 13a, 13b with the visible camera, more information can be embedded in code 13a, 13b.

In the third exemplary embodiment, temperature measurement system 100b does not include visible camera 106, but may include visible camera 106.

The present disclosure is applicable to a sheet for temperature measurement for measuring a surface temperature by a thermal camera, and a temperature measurement system.

What is claimed is:

1. A temperature measurement system that measures a surface temperature of an object to which a sheet for temperature measurement is attached, the sheet having a temperature measured section provided with a marker and having a predetermined emissivity, the temperature measurement system comprising:
    a thermal camera that acquires the surface temperature of the object and generates a temperature distribution image based on the surface temperature of the object;
    a position identifier that identifies positions of the temperature measured section and the marker based on the temperature distribution image and acquires a shape and an apparent size of the marker based on the positions of the temperature measured section and the marker;
    a distance calculator that calculates a distance between the thermal camera and the object based on the shape and the apparent size of the marker; and
    a temperature information calculator that calculates temperature information of the object based on the predetermined emissivity and the distance.

2. The temperature measurement system according to claim 1, wherein
    the marker includes a code that indicates information regarding the sheet for temperature measurement, and
    the position identifier further identifies a position of the code.

3. The temperature measurement system according to claim 2, further comprising a visible camera that captures an image of the object and generates a visible image of the object, wherein the position identifier further identifies the position of the code based on the visible image.

4. The temperature measurement system according to claim 2, further comprising a code reader that acquires information of the code.

5. The temperature measurement system according to claim 2, wherein
    the sheet for temperature measurement further includes an information display that indicates arbitrary information, and
    the temperature measurement system further includes an information manager that associates the object with at least one of the temperature information, the information indicated by the code, or the arbitrary information indicated by the information display.

* * * * *